United States Patent [19] [11] Patent Number: 4,559,629
Fedele Dell'Oste [45] Date of Patent: Dec. 17, 1985

[54] PROCEDURE AND MEANS FOR PREHEATING SCRAP TO BE CHARGED INTO A SMELTING FURNACE

[75] Inventor: Egidio Fedele Dell'Oste, Udine, Italy

[73] Assignee: Danieli & C. Officine Meccaniche SpA, Buttrio, Italy

[21] Appl. No.: 531,285

[22] Filed: Sep. 12, 1983

[30] Foreign Application Priority Data

Sep. 23, 1982 [IT] Italy ............... 83450 A/82

[51] Int. Cl.⁴ .................... F27D 13/00
[52] U.S. Cl. .......................... 373/80
[58] Field of Search .......... 373/9, 80, 81, 79; 432/9, 164

[56] References Cited

U.S. PATENT DOCUMENTS 3,269,827  8/1966  Arnesen et al. ........... 373/80 X
4,375,958  3/1983  Date et al. ............... 373/80 X
4,437,186  3/1984  Inai ..................... 373/80 X
4,470,804  9/1984  Geijer et al. ............ 373/80 X
4,478,574 10/1984  Okuno et al. ............ 373/80 X Primary Examiner—Reinhard J. Eisenzopf
Attorney, Agent, or Firm—Wegner & Bretschneider

[57] ABSTRACT

A process for preheating scrap that is to be charged into a smelting furnace using, in part, heat provided by the smelting furnace discharge fumes. The scrap is preheated with clean gas heated by a heat exchanger that exchanges heat between furnace discharge fumes and clean gas. A plant for the preheating process includes a device to gather and convey hot fumes leaving the furnace connected to both the furnace and a heat exchanger, a device to convey cooled fumes from the heat exchanger, a device to convey clean gas connected to the heat exchanger inlet, and a device to convey preheated clean gas from the heat exchanger to at least on skip of scrap.

20 Claims, 2 Drawing Figures

PROCEDURE AND MEANS FOR PREHEATING SCRAP TO BE CHARGED INTO A SMELTING FURNACE

This invention concerns a procedure for preheating the scrap intended to charge a smelting furnace, advantageously an electric arc furnace, by means of the discharge fumes of the said furnace.

The invention also concerns the means for carrying out such a procedure.

DESCRIPTION OF THE PRIOR ART

Various attempts are known which have been aimed at finding methods and means for exploiting the discharge fumes of furnaces so as to preheat the charges of scrap which have to be smelted in the furnaces thereafter.

Many of those attempts have failed for various reasons such as, for instance, problems of dust and of oxidization of the scrap. Other systems can only find a limited application.

One procedure which has been described in the published South African patent application No. 676338, corresponding to DE OS No. 1.804.098, and consists in passing through the skip of scrap the discharge fumes coming from the furnace, whereby a combustion chamber in which the discharge fumes are gathered is envisaged as being between the furnace and the skip of scrap. An outside source of heat cooperates with the combustion chamber and is able to compensate for, or to even out, such variations in the amounts of heat in the fumes, said variations being encountered during the various stages of the smelting process.

This system entails many drawbacks, among which are the following:

the build-up, in the scrap, of dust which might fall back into the working environment during the charging of the furnace;
an inadequate control of the input temperature, with the danger of reducing greatly the life of the skip if the latter is not suitably lined with refractory material.

On the other hand, the life of the lining is limited by the dynamics themselves of the phases for charging and discharging the scrap and even more so when the scrap is compressed in the skip.

The inadequate temperature control can also lead to unwanted oxidization of the scrap.

A further big shortcoming of the system cited consists in the difficulty in regulating the negative pressure in the furnace owing to the introduction of widely varying losses of load, having a value which cannot be controlled, into the fume-extraction circuit, depending on the type and quantity and any compression of the scrap in the skip.

Another system for heating the scrap is described in patent GB No. 1484420. According to this system the furnace fumes pass through a first chamber that stores heat (chequer chamber) while oxygen is blown in.

In the other working phases the fumes go directly to the stack and a given quantity of air or of another gas different from that of the furnace is put into circulation in the closed circuit between the first chamber and the chamber pre-arranged for preheating the scrap.

The foregoing system includes the following drawbacks:

there may be considerable quantities of unburnt gases (CO, H2, CH4) during the periods when oxygen is not injected, since the lack of oxygen and air in the hearth of the furnace prevents full combustion;
the considerable quantities of energy given off by the fumes are not exploited in the phases wherein the fumes are not made to pass through the chequer chamber; when this is done, it has the effect of reducing the times available for the preheating, namely for the passage of the air;
there are heavy losses of load in the zones of the air and fumes;
dust builds up within the chequer chamber; such dust is carried by the flow of air into the scrap and also creates problems of cleanliness;
there is a scanty supply of heat to the preheating chamber while oxygen is blown in, the outcome being a poor level of heat in the preheated scrap.

A system simplified as compared with that of GB No. 1,484,420 was also disclosed in FR No. 1,560,207, which envisages dilution of the combustion gases with air drawn from outside, but this system too does not overcome the actual problems of GB No. 1,484,420 but rather amplifies them precisely because of its own simplification.

In the aforesaid solutions a further drawback lies in the fact that said solutions have the skip circuit under negative pressure.

Problems arise therefrom owing to the difficulty in embodying the seals, to infiltrations of air and therefore to difficulty in regulation.

There are also the disclosures of DE AS No. 2.302.012, GB A No. 2,078,917 and FR No. 2.442.417, which represent, however, a technology basically already known and also not relevant.

DESCRIPTION OF THE INVENTION

A main purpose of this invention is to provide a solution to problems connected with dust and the build-up thereof in the scrap and also to introduce elements for improving the procedure.

One of such improvement elements consists in visualising small losses of load in the zone of the fumes or, at any rate, well determined losses which enable the regulation of fume extraction to be eliminated or made more stable so as to keep the furnace at a constant level of negative pressure.

Another element of improvement envisages the skip circuit under pressure.

In this way the embodiment of the seals is easier and the infiltrations (always present) of air which make hard the regulation of the aspiration of fumes, among other things, are eliminated.

A further purpose of this invention is to obtain efficient preheating of the scrap to be charged and thereby an energy saving in proportion to the investment.

Another purpose is to enable unlined skips to be used by dimensioning the circuit suitably and arranging adequate regulation. Such skips are less delicate, less expensive and less heavy than lined skips.

Yet another purpose of the invention is to limit the occurrence of oxidization of the scrap.

Such purposes, and others again which will become evident in the description hereinafter, are fulfilled by this invention, which comprises substantially two independent circuits cooperating with each other in preventing direct contact between the discharge fumes and the scrap to be charged.

According to the invention the first circuit takes the hot fumes from the furnace and conveys them to a heat exchanger, where the fumes give up a part of their energy and are then aspirated and conveyed from the existing fume scrubber equipment into the fume circuit.

The other circuit aspirates air, or at any rate a gas, by means of a fan which conveys such air or gas to the heat exchanger, where the air or gas is heated and then sent to the skip which is to be heated.

The exchange of heat between the fumes and the clean gas thus heated can be direct or indirect and there may be intermediate means for a temporary build-up of heat or continuous transfer of heat.

According to the invention a heating means located upstream from the skip is envisaged which is able to stabilise or increase the temperature of the heated clean gas so as to enable the system to be more flexible by varying the heating times and the temperature for preheating the scrap.

The heated clean gas passes through the scrap and gives off its heat and, by means of an appropriate hood arranged in the upper part of the skip holding the scrap, is taken to the inlet or to the outlet for the fumes on the heat exchanger, or is taken directly to the stack, or is discharged directly from the skip into the atmosphere, or else is re-cycled in a closed circuit through the fan and heat exchanger.

Our invention is therefore based on the principle of transferring the heat contained in the hot, dirty fumes to a given quantity of a clean gas which is employed for preheating the scrap, perhaps integrating therewith the heat received from the burner means and controlling at all times the temperature and flow of the fumes and gas of both circuits in the best way possible.

This invention is therefore obtained with a procedure for preheating the scrap to be charged by means of the discharge fumes of a smelting furnace, which is advantageously an arc smelting furnace, the procedure being characterized by preheating the scrap with clean gas heated, through heat exchanger means, by the discharge fumes taken from the smelting furnace.

Under one aspect of the invention the procedure visualises the controlled heating, with outside means, of heated clean gas which heats the scrap and comes out from heat exchanger means before reaching the skip holding the scrap.

Under another aspect of the procedure the heated clean gas that heats the scrap leaves the skip holding the scrap and is taken to the inlet for the discharge fumes in the heat exchanger means so as to dilute the discharge fumes or to burn any unburnt substances in the gas which arise from various impurities in the scrap (oils, fats, etc.) or to supply oxygen for the combustion of CO, H2, CH4 and other combustible substances contained in the fumes leaving the furnace.

Otherwise, the heated clean gas leaving the skip holding the scrap is taken to the outlet for fumes in the heat exchanger means, or is taken outside for other usages, or is discharged into the atmosphere, or eles is re-circulated in a closed circuit.

Under yet another aspect of the procedure the gas or air can be taken from the atmosphere, or from any container, or else the gas can consist of smelting furnace fumes which have been passed through the scrubbing system.

Our invention is also embodied with a plant for preheating the scrap to be charged into a smelting furnace, which is advantageously an arc smelting furnace, the plant being characterized by including, in cooperation, means which gather and convey hot fumes leaving the furnace and which are connected on the one hand to the furnace and on the other hand to heat exchanger means, means which convey the cooled fumes leaving the heat exchanger means, means which convey heated clean gas and are connected to the inlet of the heat exchanger means, and means which convey preheating heated clean gas leaving the heat exchanger means and which lead to at least one skip holding scrap.

Under one aspect of the plant of this invention the means conveying preheating gas comprise a burner means located near the inlet for the preheating air in the skip holding scrap.

Under another aspect of the plant of the invention the outlet of the means gathering the preheating heated clean gas is connected to the means gathering hot fumes upstream from the heat exchanger means or else is connected to the means conveying cooled fumes leaving the heat exchanger means; or else the outlet discharges the preheating gas directly into the atmosphere or into the stack, or otherwise the gathering means convey the heated clean gas in a closed circuit.

Under yet another aspect of the plant of the invention the means gathering preheating gas are connected to one or more outside heating circuits.

A further aspect of the plant of the invention envisages that the duct means for the clean gas draw air from the atmosphere, or are connected to a reservoir or to a generator of gas, or else take scrubbed fumes at the outlet of the scrubber.

BRIEF DESCRIPTION OF THE DRAWINGS

We shall describe hereinafter, as a non-restrictive example, an embodiment of the invention with reference to the attached figures, wherein.

DETAILED DESCRIPTION OF THE DRAWINGS

Figure 1:
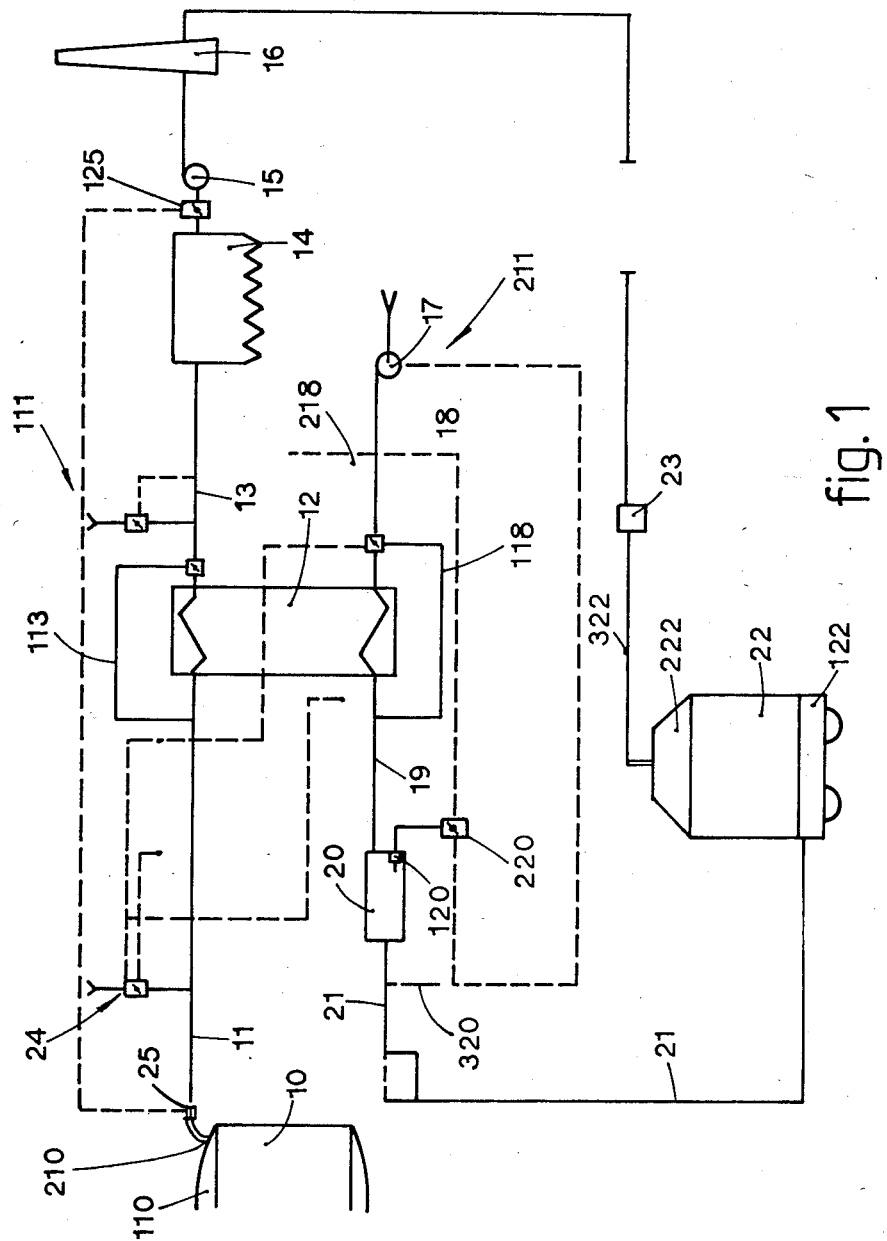
FIG. 1 shows a preheating plant according to the invention.

FIG. 1 shows a smelting furnace, here an electric arc furnace 10, to which are connected duct means 11 for gathering fumes leaving the furnace, the duct means 11 corresponding with a so-called fourth hole 210 envisaged in a crown 110 of a furnace.

The duct means 11 gathering the fumes are a part of a circuit 111 of the fumes and are connected to an inlet for fumes in a heat exchanger 12 having an exchange by fluid-to-fluid in our example.

The outlet for the fumes from the heat exchanger 12 is connected to duct means 13 which discharge the fumes and of which the outlet is connected to a scrubber device 14.

The scrubber device 14 is equipped at its outlet with a fan means 15, which takes the dust-free fumes leaving the scrubber device 14 to a discharge stack 16.

The heat exchanger 12 is provided with a by-pass duct 113 which connects the duct means 11 gathering the fumes directly to the duct means 13 discharging the fumes.

A circuit 211 of the gas, here air, which preheats the scrap, is shown in FIG. 1 and envisages a fan 17 which draws air from the environment and of which the outlet is connected to duct means 18 conveying the clean gas. The fan 17 puts the circuit 211 of the skip under pressure.

The duct means 18 are connected to the inlet for clean gas in the heat exchanger 12, of which the outlet for heated clean gas is connected to a combustion chamber 20 by discharge duct means 19.

The outlet of the combustion chamber 20 is connected, by duct means 21 conveying the preheating gas, to one or more skips holding scrap 22 borne advantageously on a truck 122.

The combustion chamber 20 comprises at least one burner 120 together with fuel-regulation means 220 linked to temperature sensors 320.

Each skip 22 is equipped at its upper end with a hood 222 connected to discharge means 322, of which the outlet can be connected either to the stack 16 or to any other usage means.

Afterburner means 23 may possibly be comprised downstream from the hood 222 so as to burn any unburnt material coming from the scrap.

The preheating circuit too comprises a by-pass duct 118 which connects the duct means 18 conveying the clean gas directly to the duct means 19 which discharges such gas.

Burner means 120 envisaged in the combustion chamber 20 have the task of increasing, when necessary, the temperature of the preheating gas before the latter reaches the skips 22.

The burner means 120 are equipped with adjustable means 220 for feeding the fuel. The means 220 are actuated when so required by the temperature of the preheating gas at the outlet of the burner means 20, the temperature being monitored by sensor means 320 envisaged at that outlet, and are also actuated when so required by the flow of the preheating gas as measured by flowmeter means 218 located upstream from the heat exchanger 12 in this instance.

It should be noted that the feed of the preheating gas also depends on the temperature of such gas at the outlet of the burner means 20.

The flow of preheating gas can possibly be regulated in relation to the outflow temperature of preheating gas leaving the heat exchanger 12, this temperature being monitored by temperature sensing means 320 at the outlet of the heat exchanger 12.

The regulation of the feed of preheating gas is obtained by acting on the aspirating fan 17 on the basis of the measurements of temperature made by the sensor means 320.

So as to keep the procedure under control, the circuit 111 of the fumes also comprises a plurality of regulating devices.

For instance, means 24 are envisaged upstream from the heat exchanger 12 so as to feed diluting air into the duct means 11 which gather the fumes.

The means 24 which feed diluting air (which serves to burn combustible gases contained in the fumes) are regulated in relation to the content of unburnt gases present in the duct 11 and also in relation to the temperature of the fumes entering the heat exchanger 12 and/or to the temperature of the preheating gas leaving the heat exchanger 12.

The example shown (FIG. 1) comprises means 25 to sense the pressure in the furnace 10, whereby the sensor means 25 operate means 125 regulating losses of load, such as dampers comprising rotatable louvers, gate valves or other means located in the circuit 111 of the fumes.

Figure 2:
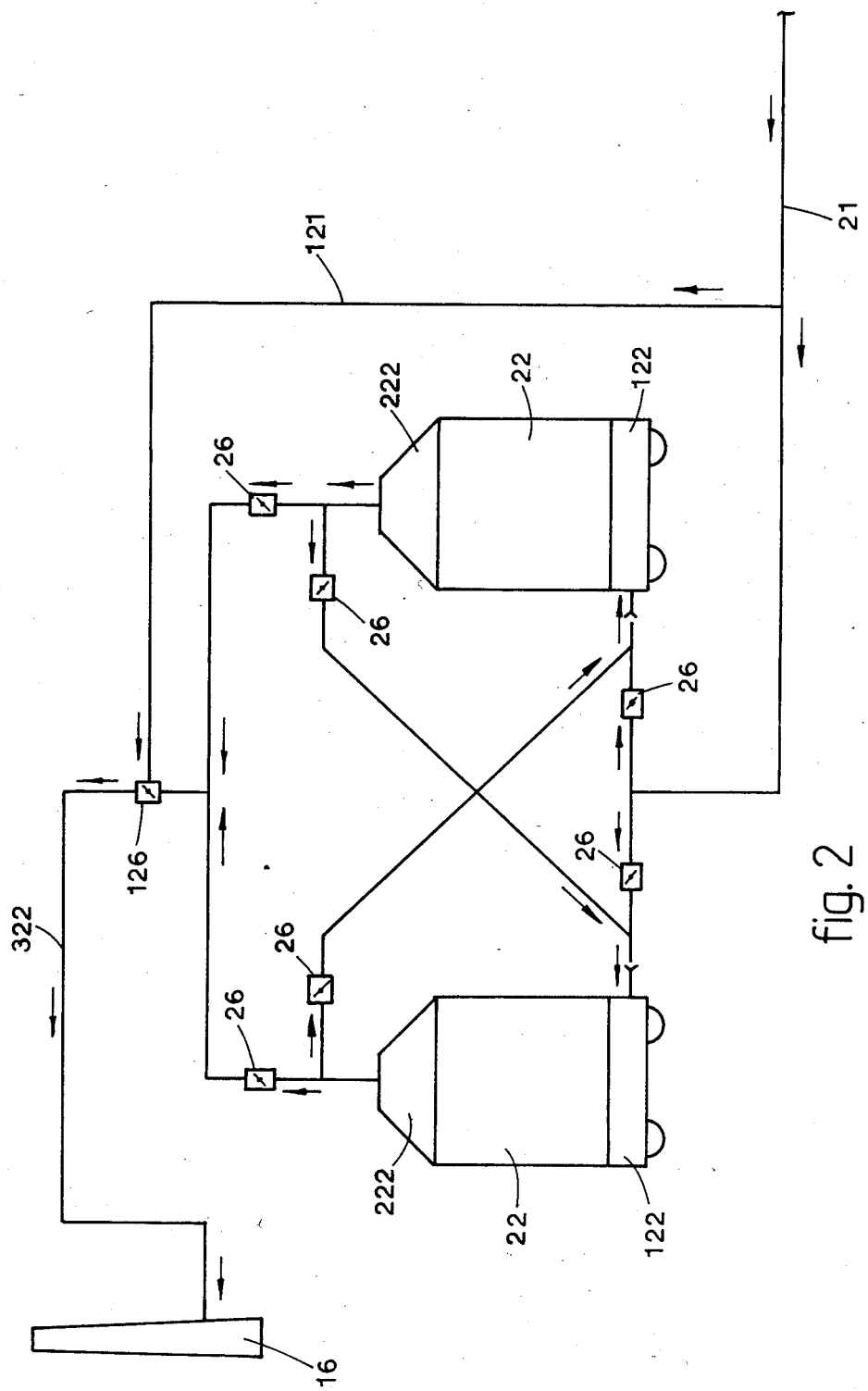
FIG. 2 shows a preheating lay-out with two skips of scrap.

FIG. 2 shows an example of the heating of two skips or two groups of skips 22. In such a lay-out it is possible to heat the two groups of skips 22 alternately, or at the same time in parallel, or at the same time in series.

If it is wished to heat the two groups alternately, the heated clean gas coming from the duct 21 is made to pass first through one group of skips and then through the other group.

When heating is to be carried out at the same time in parallel, the heated clean gas is distributed to all the groups of skips 22, and in this case the flow is split so as to serve both the groups of skips 22 shown.

Lastly, in the case of carrying out heating in series one of the groups of skips 22 receives fumes which have already passed through the other group. In this way the preheating can be performed in two phases.

The first phase envisages the heating of a first group of skips 22 with fumes which have already passed through another group of skips, whereas the second phase envisages gas coming directly from the duct means 21 and passing through the first group.

Moreover, the heated clean gas coming from the duct 21 can be partly or wholly diverted along the by-pass 121 whenever it is too cold on reaching 322 or whenever there is no scrap to preheat.

The various possible regulating methods are carried out by acting on the two-way dampers 26 and three-way damper 126.

INDEX

10—electric arc furnace
110—crown of furnace
210—fourth hole
11—duct or conveying means
111—circuit of fumes
211—circuit of clean gas
12—heat exchanger
13—discharge duct means
113—by-pass duct for fumes
14—scrubber device
15—fan means
16—discharge stack
17—fan to aspirate preheating air
18—duct means
118—by-pass duct for air
218—means to measure flow
19—duct means
20—combustion chamber
120—burner
220—means to regulate fuel
320—temperature sensing means
21—duct means
121—by-pass duct for air
22—skip for scrap
122—truck to bear skip
222—hood
322—discharge means
23—afterburner means
24—means to feed air
25—means to sense pressure
125—means to regulate losses of load
26—two-way damper
126—three-way damper

I claim:

1. A process for preheating scrap to be charged into a smelting furnace with the discharge fumes of the smelting furnace, which is advantageously an arc smelting furnace, characterized by preheating the scrap with clean gas heated through heat exchanger means by discharge fumes taken from the smelting furnace, the clean gas and the discharge fumes being circulated, each of them in its own circuit.

2. A process for preheating scrap to be charged as in claim 1, wherein the temperature of the heated clean gas that heats the scrap is controlled with outside chamber means.

3. A process for preheating scrap to be charged as in claim 1, wherein preheating heated clean gas is conveyed by discharge means to an inlet for fumes in the heat exchanger means.

4. A process for preheating scrap to be charged as in claim 1, wherein the preheating heated clean gas is conveyed by discharge means to an outlet for fumes.

5. A process for preheating scrap to be charged as in claim 1, wherein the preheating heated clean gas is conveyed directly to the atmosphere.

6. A process for preheating scrap to be charged as in claim 1, wherein the preheating heated clean gas is conveyed with a closed circuit.

7. A process for preheating scrap to be charged as in claim 1 wherein the heated clean gas is air of the atmosphere.

8. A process for preheating scrap to be charged as in claim 1 wherein that the heated clean gas is a gas drawn from a container.

9. A process for preheating scrap to be charged as in claim 1 wherein the heated clean gas consists of fumes drawn at the outlet of the scrubber means.

10. A process for preheating scrap to be charged as in claim 1 wherein at least one skip of scrap is under pressure during the preheating.

11. Plant for preheating scrap intended to charge a smelting furnace, which is advantageously an arc smelting furnace, comprising in cooperation: means (11) to gather and convey hot fumes leaving the furnace, the gathering and conveying means being connected on the one hand to the furnace and on the other hand to heat exchanger means: means to convey cooled fumes leaving the heat exchanger means: means to convey clean gas which are connected to the inlet of the heat exchanger means: and means which convey the preheating heated clean gas leaving the heat exchanger means and which lead to at least one skip of scrap.

12. Plant for preheating scrap intended to charge a smelting furnace as in claim 11, wherein the conveyor means take the fumes into a scrubber plant therefor.

13. Plant for preheating scrap intended to charge a smelting furnace as in claim 11 or 12, wherein the skip of scrap is connected to means which gather preheating air.

14. Plant for preheating scrap intended to charge a smelting furnace as in claim 11 wherein a combustion chamber is located upstream from the skip of scrap on the circuit (19–21) which conveys heated clean gas.

15. Plant for preheating scrap intended to charge a smelting furnace as in claim 11 wherein the means which gather preheating clean gas are connected to means conveying fumes upstream from the heat exchanger means.

16. Plant for preheating scrap intended to charge a smelting furnace as in claim 11 wherein the means which gather preheating clean gas are connected to means which convey fumes downstream from the heat exchanger means.

17. Plant for preheating scrap intended to charge a smelting furnace as in claim 11 wherein the means which gather preheating clean gas after preheating scrap discharge such gas directly into the atmosphere.

18. Plant for preheating scrap intended to charge a smelting furnace as in claim 11 wherein the means gathering heated clean gas are connected to the inlet for heated clean gas in at least one successive skip of scrap.

19. Plant for preheating scrap intended to charge a smelting furnace as in claim 11 further comprising afterburner means downstream from at least one skip of scrap.

20. Plant for preheating scrap intended to charge a smelting furnace as in claim 11 wherein the losses of load in the circuit of the fumes are controlled, as there are means which regulate such losses of load.

* * * * *